United States Patent
Morioka et al.

(10) Patent No.: US 12,100,801 B2
(45) Date of Patent: Sep. 24, 2024

(54) BATTERY AND METHOD FOR MANUFACTURING THE SAME

(71) Applicant: Panasonic Intellectual Property Management Co., Ltd., Osaka (JP)

(72) Inventors: Kazuhiro Morioka, Osaka (JP); Yasutaka Tsutsui, Osaka (JP); Akira Kawase, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 538 days.

(21) Appl. No.: 17/341,461

(22) Filed: Jun. 8, 2021

(65) Prior Publication Data

US 2021/0296696 A1 Sep. 23, 2021

Related U.S. Application Data

(63) Continuation of application No. PCT/JP2019/046734, filed on Nov. 29, 2019.

(30) Foreign Application Priority Data

Dec. 28, 2018 (JP) .................. 2018-248603

(51) Int. Cl.
| | |
|---|---|
| *H01M 10/0562* | (2010.01) |
| *H01M 4/36* | (2006.01) |
| *H01M 4/62* | (2006.01) |
| *H01M 4/66* | (2006.01) |
| *H01M 10/0565* | (2010.01) |
| *H01M 10/0585* | (2010.01) |

(52) U.S. Cl.
CPC ....... *H01M 10/0562* (2013.01); *H01M 4/366* (2013.01); *H01M 4/621* (2013.01); *H01M 4/667* (2013.01); *H01M 10/0565* (2013.01); *H01M 10/0585* (2013.01)

(58) Field of Classification Search
CPC ......... H01M 10/0562; H01M 10/0565; H01M 10/0585; H01M 4/366; H01M 4/621; H01M 4/667
See application file for complete search history.

(56) References Cited

U.S. PATENT DOCUMENTS

| | | | |
|---|---|---|---|
| 2001/0014420 A1 | 8/2001 | Takeuchi et al. | |
| 2010/0239907 A1* | 9/2010 | Izumi | .................. C23C 14/0676 |
| | | | 29/623.5 |
| 2010/0304211 A1* | 12/2010 | Eichinger | ............. H01M 50/54 |
| | | | 429/231.95 |

FOREIGN PATENT DOCUMENTS

| | | |
|---|---|---|
| JP | 55-133755 | 10/1980 |
| JP | 62-008900 B2 | 2/1987 |
| JP | 9-309173 | 12/1997 |
| JP | 2016-033880 | 3/2016 |

(Continued)

OTHER PUBLICATIONS

International Search Report of PCT application No. PCT/JP2019/046734 dated Feb. 18, 2020.

*Primary Examiner* — Jane J Rhee
(74) *Attorney, Agent, or Firm* — Rimon P.C.

(57) ABSTRACT

A battery according to the present disclosure includes: a collector; an electrode layer in contact with the collector; a solid electrolyte layer containing a solid electrolyte; and a sealing layer containing a sealing material, and the collector has an annealing softening temperature lower than a glass transition temperature of the sealing material.

16 Claims, 2 Drawing Sheets

(56) References Cited

FOREIGN PATENT DOCUMENTS

| | | |
|---|---|---|
| JP | 2017-073374 | 4/2017 |
| JP | 2018-142431 | 9/2018 |

* cited by examiner

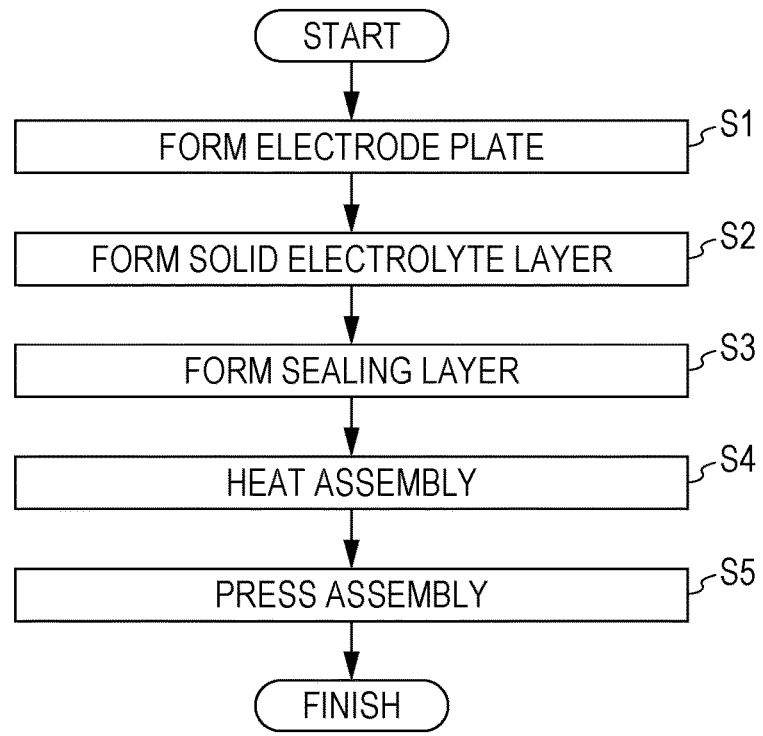
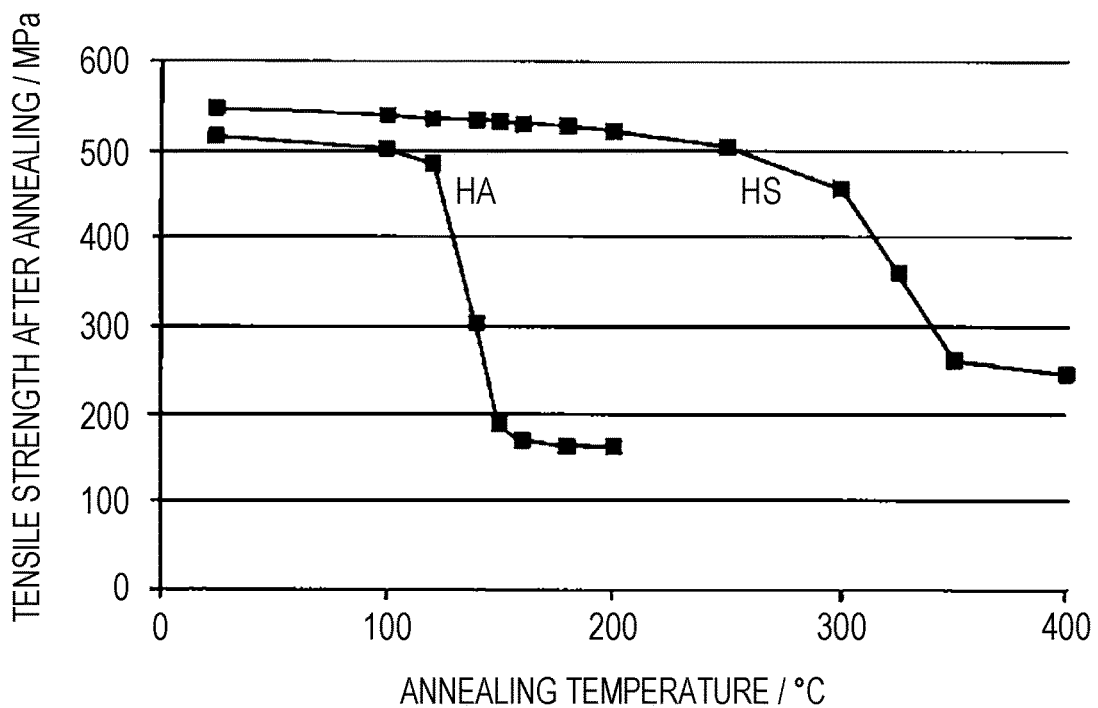

BATTERY AND METHOD FOR MANUFACTURING THE SAME

BACKGROUND

1. Technical Field

The present disclosure relates to a battery and a method for manufacturing the same.

2. Description of the Related Art

Japanese Unexamined Patent Application Publication Nos. 2017-73374 and 2016-33880 each have disclosed an all solid state battery including a sealing layer in contact with a battery element.

In a battery using a solid electrolyte, in order to suppress intrusion of moisture into the battery and/or in order to maintain the structure so as to prevent a short circuit caused by contact between collectors, a sealing layer may be provided in some cases.

In a related technique, a mechanical strength of a battery including a sealing layer is desired to be secured. In order to secure the mechanical strength of the battery, it is important to sufficiently secure a sealing strength by the sealing layer.

SUMMARY

In one general aspect, the techniques disclosed here feature a battery comprising: a collector, an electrode layer in contact with the collector; a solid electrolyte layer containing a solid electrolyte; and a sealing layer containing a sealing material. In the battery described above, the collector has an annealing softening temperature lower than a glass transition temperature of the sealing material.

According to the present disclosure, a sealing strength by the sealing layer can be sufficiently secured.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 2 is a flowchart showing one example of a method for manufacturing a battery; and FIG. 3 is a graph showing an annealing softening curve of a collector.

DETAILED DESCRIPTION

Figure 1A:
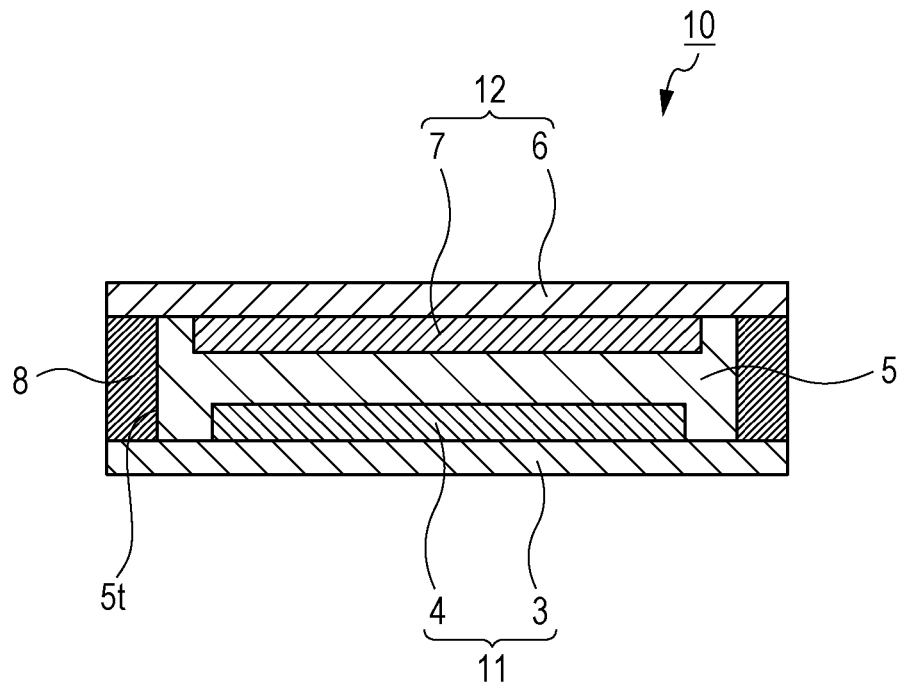
FIG. 1A is a schematic cross-sectional view of an all solid state battery according to one embodiment of the present disclosure.

In view of an increase in area, continuous production, and mass production of a battery, a coating process has been investigated to be applied to manufacturing of an all solid state battery. In the coating process, a slurry is prepared by dispersing a raw material powder in a solvent. Since the slurry is applied to a collector by a coating method, such as a screen printing method or a die coating method, a coating film is formed. By a thermal process using a drying furnace or the like, the solvent is evaporated from the coating film. Accordingly, an electrode plate including the collector and an electrode layer is obtained.

A slurry containing a solid electrolyte is applied on the electrode plate to form a coating film. The coating film is dried, so that a solid electrolyte layer is formed on the electrode plate. An electrode plate functioning as a positive electrode and an electrode plate functioning as a negative electrode are placed to face each other and are then pressed, so that an all solid state battery is obtained. In order to improve the performance of the battery, before the slurry containing a solid electrolyte is applied, the electrode plates may be pressed in some cases.

According to an intensive research carried out by the present inventors, in the all solid state battery manufactured by the steps described above, warping may be generated in some cases.

A force generated by the press may partially function as a force to deform the electrode layer and/or the solid electrolyte layer in a direction orthogonal to a press direction. When a press temperature is lower than a predetermined temperature, the electrode plate may be warped to have an upward convex shape or a downward convex shape. When the electrode layer is located at an upper side, and the collector is located at a lower side, the electrode plate is warped to have an upward convex shape. When the electrode layer is located at a lower side, and the collector is located at an upper side, the electrode plate is warped to have a downward convex shape. Since those warpings are each a deformation in a direction so as to separate the collector from a sealing layer, a sealing strength by the sealing layer is decreased. In addition, when the warpage is large, cracks may be generated in the electrode layer, and/or the electrode layer may be peeled away from the collector in some cases. As a result, an internal resistance of the battery may be increased, and/or an ion conductivity thereof may be decreased, so that the performance of the battery is degraded.

(Guideline of Aspects of Present Disclosure)

A battery according to a first aspect of the present disclosure, includes:

a collector;
an electrode layer in contact with the collector;
a solid electrolyte layer containing a solid electrolyte; and
a sealing layer containing a sealing material, and
the collector has an annealing softening temperature lower than a glass transition temperature of the sealing material.

According to the first aspect, a battery in which warping is suppressed can be easily obtained.

According to a second aspect of the present disclosure, for example, in the battery of the first aspect, when a tensile strength of the collector at 25° C. is regarded as 100%, the annealing softening temperature of the collector may be a temperature at which the tensile strength of the collector is 90%.

According to a third aspect of the present disclosure, for example, in the battery of the first or the second aspect, the collector may have an annealing softening curve having a flexion point. According to the third aspect, a highly reliable battery can be easily realized.

According to a fourth aspect of the present disclosure, for example, in the battery of any one of the first to the third aspects, the electrode layer and the solid electrolyte layer may be laminated to each other, and the sealing layer may be in contact with at least one selected from a side surface of the electrode layer and a side surface of the solid electrolyte layer. According to the structure as described above, a sealing strength by the sealing layer can be more sufficiently secured.

According to a fifth aspect of the present disclosure, for example, in the battery of any one of the first to the fourth aspects, the collector may contain copper. Since having an excellent electron conductivity, copper or a copper alloy is suitable as a material for the collector of the battery.

According to a sixth aspect of the present disclosure, for example, in the battery of any one of the first to the fifth aspects, the sealing material may contain a thermoplastic resin. Since a thermoplastic resin is used, the range of material selection is expanded.

According to a seventh aspect of the present disclosure, for example, in the battery of the sixth aspect, the thermoplastic resin may include a polyimide. Since a thermoplastic resin, such as a polyimide, having a high glass transition temperature is used as the sealing material, even when a press temperature is high, the sealing strength of the sealing layer can be maintained.

According to an eighth aspect of the present disclosure, for example, in the battery of any one of the first to the seventh aspects, the electrode layer may contain an electrode active material and a solid electrolyte. When the solid electrolyte is contained together with the electrode active material, an ion conductivity in the electrode layer can be increased.

A method for manufacturing a battery according to a ninth aspect of the present disclosure, includes:

heating an electric power generation element including a collector, an electrode layer, and a solid electrolyte layer to a press temperature; and pressing the electric power generation element at the press temperature, and the press temperature is higher than an annealing softening temperature of the collector.

In the case in which the press is performed at a temperature higher than the annealing softening temperature of the collector, when the electrode layer is elongated, the collector is also plastic deformed. Hence, warping of the electrode plate is suppressed.

According to a tenth aspect of the present disclosure, for example, the battery manufacturing method of the ninth aspect may further include; disposing a sealing material so as to be in contact with the electric power generation element, when the electric power generation element is heated to the press temperature, the sealing material may be heated to the press temperature, and when the electric power generation element is pressed, the sealing material may be pressed at the press temperature. According to the tenth aspect, the battery of the present disclosure can be easily manufactured.

According to an eleventh aspect of the present disclosure, for example, in the battery manufacturing method of the tenth aspect, the sealing material may have a glass transition temperature higher than the annealing softening temperature of the collector. According to the eleventh aspect, the shape of a sealing layer is maintained, and the strength thereof is also maintained.

According to a twelfth aspect of the present disclosure, for example, in the battery manufacturing method of the eleventh aspect, the press temperature may be lower than the glass transition temperature of the sealing material. According to the twelfth aspect, since a sealing strength by the sealing layer is sufficiently secured, an all solid state battery having a high mechanical strength can be provided.

Embodiments

Hereinafter, embodiments of the present disclosure will be described with reference to the drawings. The present disclosure is not limited to the following embodiments.

[Structure of all Solid State Battery]

FIG. 1A is a schematic cross-sectional view of an all solid state battery 10 according to one embodiment. As shown in FIG. 1A, the all solid state battery 10 includes a positive electrode 11, a negative electrode 12, a solid electrolyte layer 5, and a sealing layer 8. The positive electrode 11 includes a positive electrode collector 3 and a positive electrode layer 4. The negative electrode 12 includes a negative electrode collector 6 and a negative electrode layer 7. On the positive electrode collector 3, the positive electrode layer 4 is disposed. The positive electrode layer 4 is in contact with the positive electrode collector 3. On the negative electrode collector 6, the negative electrode layer 7 is disposed. The negative electrode layer 7 is in contact with the negative electrode collector 6. The solid electrolyte layer 5 is disposed between the positive electrode layer 4 and the negative electrode layer 7. The positive electrode layer 4, the solid electrolyte layer 5, and the negative electrode layer 7 are laminated in this order. The solid electrolyte layer 5 is in contact with the positive electrode layer 4 and the negative electrode layer 7. The sealing layer 8 is in contact with the positive electrode collector 3 and the negative electrode collector 6. The positive electrode layer 4 and the negative electrode layer 7 are each an example of the electrode layer. The positive electrode 11 and the negative electrode 12 are each an example of the electrode plate. According to the sealing layer 8, intrusion of moisture into the all solid state battery 10 can be suppressed, and/or since the structure of the all solid state battery 10 is maintained, a short circuit caused by the contact between the positive electrode collector 3 and the negative electrode collector 6 can be prevented. As a result, a mechanical strength of the all solid state battery 10 can be secured.

When the all solid state battery 10 is plan viewed, the sealing layer 8 has a frame shape. The positive electrode layer 4, the solid electrolyte layer 5, and the negative electrode layer 7 are surrounded by the sealing layer 8. The positive electrode collector 3 is in contact with a bottom surface of the sealing layer 8, and the negative electrode collector 6 is in contact with a top surface of the sealing layer 8.

According to this embodiment, the sealing layer 8 is in contact with a side surface $5t$ of the solid electrolyte layer 5. According to the structure as described above, the sealing strength by the sealing layer 8 can be more sufficiently secured. The sealing layer 8 is not in contact with the positive electrode layer 4 and the negative electrode layer 7. According to the structure as described above, in the manufacturing of the all solid state battery 10, a sealing material and an electrode material are not likely to react with each other. That is, a risk of degradation in performance of the battery can be avoided. In the manufacturing of the all solid state battery, when the sealing material is impregnated in the electrode layer, an impregnated portion thereof cannot function as the electrode. As a result, the performance of the battery is degraded. In this embodiment, since the electrode layer is formed before the sealing layer 8 is formed, the problem as described above is not likely to be generated, and an area of the electrode which contributes to electric power generation can be easily defined. In addition, even when a large number of batteries are manufactured, the performance of the battery is not likely to be degraded.

Figure 1B:
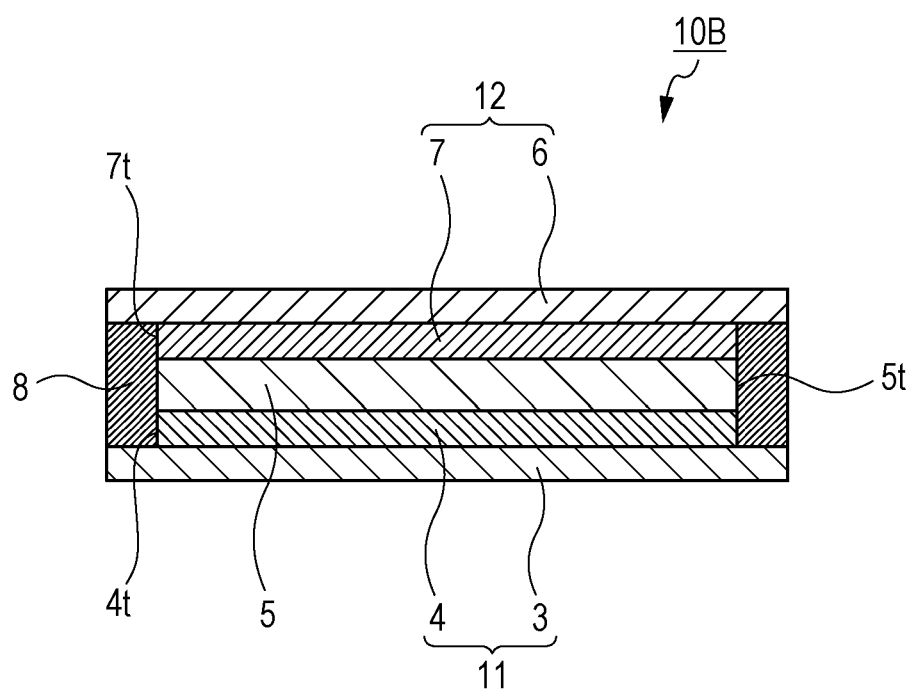
FIG. 1B is a schematic cross-sectional view of an all solid state battery according to a modified example.

FIG. 1B is a schematic cross-sectional view of an all solid state battery 10B according to a modified example. In the all solid state battery 10B of this modified example, a side surface 4t of a positive electrode layer 4, a side surface 7t of a negative electrode layer 7, and a side surface 5t of a solid electrolyte layer 5 are in contact with a sealing layer 8. According to the structure as described above, a sealing strength by the sealing layer 8 can be more sufficiently secured. In addition, since the volume of the solid electrolyte layer 5 can be decreased, reduction in manufacturing cost of the all solid state battery 10B can be expected by the reduction in material cost. The other components of the all solid state battery 10B are the same as those of the all solid state battery 10.

The respective components of the all solid state battery 10 will be described in detail.

(Positive Electrode 11 and Negative Electrode 12)

The positive electrode 11 includes the positive electrode collector 3 and the positive electrode layer 4. The negative electrode 12 includes the negative electrode collector 6 and the negative electrode layer 7.

A material for the positive electrode collector 3 may be the same as or different from a material for the negative electrode collector 6. As the materials for the positive electrode collector 3 and the negative electrode collector 6, for example, there may be mentioned copper, a copper alloy, aluminum, an aluminum alloy, or stainless steel. The shapes of the positive electrode collector 3 and the negative electrode collector 6 are also not particularly limited. As the shapes of the positive electrode collector 3 and the negative electrode collector 6, for example, there may be mentioned foil, a film, or a sheet. Irregularity may also be imparted to the surfaces of the positive electrode collector 3 and the negative electrode collector 6.

At least one selected from the positive electrode collector 3 and the negative electrode collector 6 may contain copper. The positive electrode collector 3 and/or the negative electrode collector 6 may be formed from copper or a copper alloy. Since having an excellent electron conductivity, copper or a copper alloy is suitable as a material for the collector of the all solid state battery 10.

At least one selected from the positive electrode collector 3 and the negative electrode collector 6 is formed from a material having an annealing softening curve.

When a material, such as a metal, is heat-treated, the strength of the material may be decreased in some cases. This phenomenon is called an annealing softening phenomenon. After a heat treatment is performed on a test piece at a predetermined temperature, and a temperature of the test piece is then decreased to 25° C. (room temperature) by slow cooling (air cooling), a tensile test is performed to measure a tensile strength of the test piece. A graph showing the relationship between the heat treatment temperature and the tensile strength is called an annealing softening curve.

The tensile strength can be measured by a tensile tester in accordance with Japanese Industrial Standards JIS Z 2241 (2011). When the test piece is rolled, a tensile strength in a direction parallel to a rolling direction can be measured.

In this embodiment, the annealing softening curve of the collector may have a flexion point. For example, a tensile strength of rolled copper or a rolled copper alloy shows an annealing softening behavior having a flexion point with respect to a heat treatment temperature. In this case, a highly reliable battery can be easily realized.

A tensile strength of general electrolytic copper foil is linearly decreased with respect to the heat treatment temperature and has no flexion point.

In this specification, when an annealing temperature of the collector is increased, an annealing softening temperature is an annealing temperature at which the tensile strength is decreased by 10% with respect to the tensile strength at room temperature. That is, when the tensile strength of the collector at 25° C. (room temperature) is regarded as 100%, the annealing softening temperature of the collector is a temperature at which the tensile strength of the collector is 90%. A tensile strength of 100% is a tensile strength to be obtained before the collector receives a thermal history at a sufficiently high temperature. Hence, it is believed that after the all solid state battery 10 is assembled, the collector is not able to maintain its original tensile strength. However, it is also believed that in the collector, a portion thereof which receives no thermal history at a sufficiently high temperature, such as a portion to be connected to a terminal, is able to maintain its original tensile strength.

An annealing time of the collector when the annealing softening temperature is measured is not particularly limited. The annealing time is, for example, longer than or equal to 30 minutes and shorter than or equal to one hour.

The annealing softening temperature of the collector used for the all solid state battery 10 of this embodiment is lower than a glass transition temperature of a sealing material forming the sealing layer 8. According to the structure as described above, an all solid state battery 10 in which the warping is suppressed can be easily obtained. The shape of the sealing layer 8 can also be easily maintained.

The annealing softening temperature of the collector may be, for example, 200° C. or less, may be 150° C. or less, and may also be 120° C. or less.

The collector may be formed, for example, from rolled copper foil or rolled copper alloy foil. Those materials each have a clear annealing softening temperature and are each suitable as a material for the collector of the all solid state battery 10 of this embodiment.

The electrode layer contains an active material. A composition of the active material is not particularly limited and may be selected in accordance with a required function. The electrode layer may contain, if needed, other materials, such as an electrically conductive material, a solid electrolyte, and a binder.

As the active materials, in general, a positive electrode active material and a negative electrode active material may be mentioned. In accordance with the required function, the positive electrode active material and the negative electrode active material are selected.

As the positive electrode active material, for example, there may be mentioned a lithium-containing transition metal oxide, a vanadium oxide, a chromium oxide, or a lithium-containing transition metal sulfide. As the lithium-containing transition metal oxide, for example, there may be mentioned $LiCoO_2$, $LiNiO_2$, $LiMnO_2$, $LiMn_2O_4$, $LiNiCoMnO_2$, $LiNiCoO_2$, $LiCoMnO_2$, $LiNiMnO_2$, $LiNiCoMnO_4$, $LiMnNiO_4$, $LiMnCoO_4$, $LiNiCoAlO_2$, $LiNiPO_4$, $LiCoPO_4$, $LiMnPO_4$, $LiFePO_4$, $Li_2NiSiO_4$, $Li_2CoSiO_4$, $Li_2MnSiO_4$, $Li_2FeSiO_4$, $LiNiBO_3$, $LiCoBO_3$, $LiMnBO_3$, or $LiFeBO_3$. As an example of the lithium-containing transition metal sulfide, for example, there may be mentioned $LiTiS_2$, $Li_2TiS_3$, or $Li_3NbS_4$. At least one of those positive electrode active materials may be used.

As the negative electrode active material, for example, there may be mentioned a carbon material, a lithium alloy, a metal oxide, lithium nitride ($Li_3N$), a lithium metal, or an indium metal. As the carbon material, for example, there may be mentioned artificial graphite, graphite, non-graphitizable carbon, or graphitizable carbon. As the lithium alloy, for example, an alloy between lithium and at least one metal selected from the group consisting of Al, Si, Pb, Sn, Zn, and Cd may be mentioned. As the metal oxide, for example, $LiFe_2O_3$, $WO_2$, $MoO_2$, SiO, or CuO may be mentioned. A mixture or a composite formed from a plurality of materials may also be used as the negative electrode active material.

The shapes of the positive electrode active material and the negative electrode active material are not particularly limited and may be, for example, in the form of particles. The sizes of the positive electrode active material and the negative electrode active material are also not particularly limited. When the positive electrode active material and the negative electrode active material are each in the form of particles, an average particle diameter of the particles of the positive electrode active material and an average particle diameter of the particles of the negative electrode active material may be larger than or equal to 0.5 µm and smaller than or equal to 20 µm or may also be larger than or equal to 1 µm and smaller than or equal to 15 µm. The average particle diameter may be, for example, a median diameter (d50) measured using a particle size distribution measurement device.

When the particle size distribution cannot be measured, the average particle diameter of the particles can be calculated by the following method. A particle swarm is observed by an electron microscope, and an area of a specific particle in an electron microscopic image is calculated by an image processing. When the particle swarm only cannot be direct-observed, a structure in which particles are contained is observed by an electron microscope, and an area of a specific particle in an electron microscopic image is calculated by an image processing. A diameter of a circle having an area equal to the area thus calculated is regarded as the diameter of the specific particle. The diameters of an arbitrary number of particles (for example, 10 particles) are calculated, and an average value obtained therefrom is regarded as the average particle diameter of the particles.

The electrically conductive material is not particularly limited and may be appropriately selected from materials which are generally used for a lithium ion battery. As the electrically conductive material, for example, there may be mentioned graphite, carbon black, electrically conductive fibers, an electrically conductive oxide, or an organic electrically conductive material. Those electrically conductive materials may be used alone, or at least two types thereof may be used in combination.

The solid electrolyte is not particularly limited and may be appropriately selected, in accordance with the type of active material and the application of the all solid state battery 10, from materials generally used for a lithium ion battery. As the solid electrolytes, for example, there may be mentioned a sulfide-based solid electrolyte material, an oxide-based solid electrolyte material, other inorganic solid electrolyte materials, and an organic solid electrolyte material. The solid electrolytes may be used alone, or at least two types thereof may be used in combination. The shape of the solid electrolyte is not particularly limited and may be, for example, in the form of particles. The size of the solid electrolyte is also not particularly limited. When the solid electrolyte is in the form of particles, an average particle diameter of the particles of the solid electrolyte may be larger than or equal to 0.01 µm and smaller than or equal to 15 µm and may also be larger than or equal to 0.2 µm and smaller than or equal to 10 µm. The average particle diameter may be, for example, a median diameter (d50) measured by a particle size distribution measurement device.

The binder is not particularly limited and may be appropriately selected from materials generally used for a lithium ion battery. As the binder, for example, a thermoplastic resin may be mentioned. As the thermoplastic resin, for example, a thermoplastic rubber, such as a styrene-butadiene copolymer or a styrene-ethylene-butadiene copolymer, may be mentioned. When a slurry is prepared, in order to prevent degradation in performance, such as ion conductivity, of the solid electrolyte, a solvent having a low polarity may be used in some cases. When a slurry is formed, a styrene-butadiene copolymer or a styrene-ethylene-butadiene copolymer also shows a preferable solubility to a solvent having a low polarity. Hence, when the polymer as described above is used as the binder, the degradation in performance of the solid electrolyte can be prevented. As other examples of the thermoplastic resin, for example, there may be mentioned an ethyl cellulose, a poly(vinylidene fluoride), a polyethylene, a polypropylene, a polyisobutylene, a polystyrene, a poly(vinyl chloride), a poly(vinyl acetate), a poly(methyl methacrylate), a poly(ethyl methacrylate), a poly(n-propyl methacrylate), a poly(n-butyl methacrylate), a polydimethylsiloxane, cis-1,4-polybutadiene, a polyisoprene, nylon-6, nylon-6,6, a poly(ethylene terephthalate), and a poly(vinyl alcohol). Those binders may be used alone, or at least two types thereof may be used in combination.

(Solid Electrolyte Layer 5)

A material for the solid electrolyte layer 5 is not particularly limited and may be appropriately selected, in accordance with the type of active material and the application of the all solid state battery 10, from materials generally used for a lithium ion battery. As the materials for the solid electrolyte layer 5, for example, there may be mentioned a sulfide-based solid electrolyte material, an oxide-based solid electrolyte material, other inorganic solid electrolyte materials, and an organic solid electrolyte material. The solid electrolytes may be used alone, or at least two types thereof may be used in combination. The shape of the solid electrolyte is not particularly limited and may be, for example, in the form of particles. The size of the solid electrolyte is also not particularly limited. When the solid electrolyte is in the form of particles, an average particle diameter of the particles of the solid electrolyte may be larger than or equal to 0.01 µm and smaller than or equal to 15 µm and may also be larger than or equal to 0.2 µm and smaller than or equal to 10 µm. The average particle diameter may be, for example, a median diameter (d50) measured by a particle size distribution measurement device.

(Sealing Layer 8)

As the sealing material forming the sealing layer 8, a thermoplastic resin may be used. Since the thermoplastic resin is used, the range of material selection is expanded.

As a thermoplastic resin having a high glass transition temperature, for example, a polyimide may be mentioned. When a thermoplastic resin, such as a polyimide, having a high glass transition temperature is used as the sealing material, even in the case in which a press temperature is high, the sealing strength of the sealing layer 8 can be maintained. That is, since the range of the press temperature can be set at a high temperature side, the all solid state battery 10 can be efficiently manufactured. As another example of the thermoplastic resin usable as the sealing material, for example, a poly(α-methylstyrene), a polycarbonate, or a polyacrylonitrile may be mentioned. Furthermore, a thermosetting resin or a photocurable resin may also be used as the sealing material. Those materials may be used alone, or at least two types thereof may be used in combination. When the glass transition temperature of the sealing material is sufficiently high, the sealing strength by the sealing layer can be sufficiently maintained.

The glass transition temperature may be measured by a thermal analytical method, such as a differential scanning calorimetry.

In order to enhance the function of the sealing layer 8, the sealing material may also contain other materials, such as a functional powder and/or functional fibers. As the other materials, for example, an inorganic filler and a silica gel may be mentioned. The inorganic filler has a function to increase a structure maintaining force. The silica gel has a function to enhance a water resistance. Those functional powder and fibers may be used alone, or at least two types thereof may be used in combination.

[Method for Manufacturing all Solid State Battery]

Next, one example of a method for manufacturing the all solid state battery 10 will be described. FIG. 2 shows a procedure of manufacturing of the all solid state battery 10.

First, in Step S1, the positive electrode 11 and the negative electrode 12 are formed. A mixture is prepared which contains a positive electrode active material or a negative electrode active material and also contains, if needed, other materials, such as an electrically conductive material, a solid electrolyte, and a binder. A mixing ratio of the materials may be appropriately determined in accordance with use application of the battery and the like. Subsequently, the mixture is mixed together by a mixing machine. The mixing machine is not particularly limited, and a known machine may be used. As the mixing machine, for example, a planetary mixer or a ball mill may be mentioned. However, a mixing method of the materials is not particularly limited.

When the solid electrolyte is contained together with the active material in the positive electrode 11 and/or the negative electrode 12, the ion conductivity of the positive electrode 11 and/or the negative electrode 12 can be enhanced. A composition of the solid electrolyte contained in the positive electrode 11 and/or the negative electrode 12 may be the same as or different from a composition of the solid electrolyte contained in the solid electrolyte layer 5.

Next, the mixture containing the active material is adhered on a collector to have a predetermined thickness. Accordingly, an electrode plate including the collector and an electrode layer is obtained.

Another method for forming an electrode plate is as follows. First, a mixture containing an active material is dispersed in an appropriate solvent to prepare a slurry. The slurry is applied on the positive electrode collector 3 or the negative electrode collector 6 to form a coating film. Subsequently, the coating film is dried, so that the electrode plate is formed. As a slurry coating method, for example, there may be mentioned a screen printing method, a die coating method, a spray method, or a doctor blade method.

Next, in Step S2, the solid electrolyte layer 5 is formed. A method for forming the solid electrolyte layer 5 is not particularly limited, and a known method may be used. First, a mixture containing a solid electrolyte, a binder, and the like is prepared. A mixing ratio of the materials is appropriately determined in accordance with use application of the all solid state battery 10 and the like. Subsequently, the mixture is mixed together by a mixing machine. The mixing machine is not particularly limited, and a known machine may be used. As the mixing machine, for example, a planetary mixer or a ball mill may be mentioned. However, a mixing method of the materials is not particularly limited.

The mixture containing a solid electrolyte is adhered on the positive electrode layer 4 or the negative electrode layer 7 to have a predetermined thickness. Accordingly, the solid electrolyte layer 5 is formed.

Another method for forming the solid electrolyte layer 5 is as follows. First, a mixture containing a solid electrolyte is dispersed in an appropriate solvent to prepare a slurry. The slurry is applied on the positive electrode layer 4 or the negative electrode layer 7 to form a coating film. Subsequently, the coating film is dried, so that the solid electrolyte layer 5 is formed. As a slurry coating method, for example, there may be mentioned a screen printing method, a die coating method, a spray method, or a doctor blade method.

Still another method for forming the solid electrolyte layer 5 is as follows. The slurry described above is applied on a support member to form a coating film. Subsequently, the coating film is dried, so that a solid electrolyte sheet is obtained. The solid electrolyte sheet thus obtained is transferred from the support member to the positive electrode 11 or the negative electrode 12, so that the solid electrolyte layer 5 disposed on the positive electrode 11 or the negative electrode 12 can be formed.

A group of the positive electrode 11 and the solid electrolyte layer 5 is an electric power generation element including the collector, the electrode layer, and the electrolyte layer. A group of the negative electrode 12 and the solid electrolyte layer 5 is also an electric power generation element including the collector, the electrode layer, and the electrolyte layer.

Subsequently, in Step S3, the sealing layer 8 is formed. A method for forming the sealing layer 8 is not particularly limited, and a known method may be used. For example, a sealing material is applied to the electrode plate so as to be in contact with at least one selected from the electrode layer and the solid electrolyte layer 5. The sealing material may also be in contact with at least one selected from the positive electrode collector 3 and the negative electrode collector 6. That is, the sealing material is disposed so as to be in contact with the electric power generation element. As a coating method of the sealing material, for example, a screen printing method, an ink jet method, or a coating method using a dispenser may be mentioned. If needed, the sealing material is dried, so that the sealing layer 8 is formed.

Next, the positive electrode 11 and the negative electrode 12 are laminated so as to obtain an assembly including the positive electrode 11, the solid electrolyte layer 5, the negative electrode 12, and the sealing layer 8. The positive electrode layer 4 is disposed on the positive electrode collector 3, and the negative electrode layer 7 is disposed on the negative electrode collector 6. The solid electrolyte layer 5 is disposed between the positive electrode layer 4 and the negative electrode layer 7.

Subsequently, in Step S4, the assembly is heated to a press temperature. In other words, the electric power generation element is heated to the press temperature. When the electric power generation element is heated to the press temperature, the sealing material forming the sealing layer 8 is also heated to the press temperature. For example, when a flat plate press machine is used, a plate in contact with the assembly during pressure application is heated, so that the assembly can be heated to the press temperature. When a roll press machine is used, by heating a roller, the assembly can also be heated to the press temperature.

Next, in Step S5, the assembly is pressed at the press temperature. In other words, the electric power generation element is pressed at the press temperature. When the electric power generation element is pressed at the press temperature, the sealing material forming the sealing layer 8 is also pressed at the press temperature. The assembly is pressed so that a load is applied in a thickness direction of each layer.

Since the press is performed during heating, filling rates of the active material and the solid electrolyte are increased, and a contact interface area between particles of the active material and particles of the solid electrolyte is increased. As a result, the performance of the all solid state battery 10 is improved.

A force generated by the press may partially function as a force to deform the electrode layer and/or the solid electrolyte layer in a direction orthogonal to the press direction. When the press temperature is lower than a predetermined temperature, the electrode plate may be warped to have an upward convex shape or a downward convex shape. When the electrode layer is located at an upper side, and the collector is located at a lower side, the electrode plate is warped to have an upward convex shape. When the electrode layer is located at a lower side, and the collector is located at an upper side, the electrode plate is warped to have a downward convex shape. Since those warpings are each a deformation in a direction so as to separate the collector from the sealing layer, the sealing strength by the sealing layer is decreased. In addition, when the warpage is large, cracks may be generated in the electrode layer, and/or the electrode layer may be peeled away from the collector in some cases. As a result, the internal resistance of the battery may be increased, and/or the ion conductivity thereof may be decreased, so that the performance of the battery is degraded.

On the other hands, in this embodiment, the press temperature is higher than the annealing softening temperature of the collector. The collector can be plastic deformed at the press temperature. Since the collector is plastic deformed, the strain generated in association with the compression by the press is relaxed. That is, a force to deform the electrode layer and/or the solid electrolyte layer in the direction orthogonal to the press direction can be decreased, and hence, the warping can be significantly suppressed. As a result, a serious decrease in sealing strength can be suppressed. The all solid state battery thus manufactured has a high sealing strength and a high reliability.

The strength of the collector heated to a temperature higher than the annealing softening temperature during the press is decreased. However, the strength of a portion of the collector which is not heated is not changed. Hence, in the battery, portions of the collector having strengths different from each other may be present in some cases.

The difference between the press temperature and the annealing softening temperature of the collector is not particularly limited. When the press temperature is represented by T1, and the annealing softening temperature of the collector is represented by T2, the press temperature can be adjusted so that (T1-T2) is, for example, in a range of higher than or equal to 0° C. and lower than or equal to 30° C.

In this embodiment, the glass transition temperature of the sealing material forming the sealing layer 8 is higher than the annealing softening temperature of the collector. In this case, although the collector is deformed during the press, since the sealing material is not plastic deformed, the shape of the sealing layer 8 is maintained, and the strength thereof is also maintained. When the annealing softening temperature of the collector is represented by T2, and the glass transition temperature of the sealing material is represented by Tg, the press temperature can be adjusted so that (Tg-T2) is, for example, in a range of higher than or equal to 0° C. and lower than or equal to 30° C.

In this embodiment, the press temperature is lower than the glass transition temperature of the sealing material forming the sealing layer 8. In this case, since the sealing material is not plastic deformed, the shape of the sealing layer 8 is maintained. Hence, in the all solid state battery 10 thus formed, since the sealing strength by the sealing layer 8 is sufficiently secured, an all solid state battery 10 having a high mechanical strength can be provided. When the press temperature is represented by T1, and the glass transition temperature of the sealing material is represented by Tg, the press temperature can be adjusted so that (Tg-T1) is, for example, in a range of higher than or equal to 0° C. and lower than or equal to 30° C.

In addition, the press temperature may be higher than the glass transition temperature of the sealing material forming the sealing layer 8. In this case, since the press is performed at a higher temperature, and the rate of change in strength of the collector is increased, a time necessary for a manufacturing process can be shortened. When the press temperature is represented by T1, and the glass transition temperature of the sealing material is represented by Tg, the press temperature can be adjusted so that (T1-Tg) is, for example, in a range of higher than or equal to 0° C. and lower than or equal to 20° C.

After the positive electrode 11, the negative electrode 12, and the solid electrolyte layer 5 are separately heated to the press temperature, and the assembly is then formed, the assembly may be heated and pressed so as to obtain the all solid state battery 10.

The press temperature is specified, for example, by a surface temperature of the collector. However, when a heat capacity of the plate or a heat capacity of the roller is sufficiently large as compared to a heat capacity of an object, the press temperature may be, for example, a surface temperature of the plate or a surface temperature of the roller. "To press at a press temperature" indicates that while being maintained at a press temperature, the object is pressed.

In this embodiment, when the electric power generation element is heated to the press temperature, the sealing layer 8 is also heated to the press temperature. When the electric power generation element is pressed at the press temperature, the sealing layer 8 is also pressed at the press temperature. In particular, the entire assembly including the electric power generation element and the sealing layer 8 is pressed at the press temperature so that the load is applied in a thickness direction of each layer. Hence, the all solid state battery 10 can be easily manufactured. Furthermore, since the sealing layer 8 is heated to the press temperature and then pressed, the sealing strength by the sealing layer 8 can be maintained. As a result, the performance of the all solid state battery 10 is improved.

Through the steps described above, the all solid state battery 10 is obtained.

EXAMPLES

Hereinafter, the present disclosure will be described in more detail with reference to Examples. The following Examples are described by way of example, and the present disclosure is not limited thereto.

A solid electrolyte, a binder, and a solvent were mixed together, so that a slurry was obtained. The slurry was applied on a collector having a size of 20 mm by 20 mm and was then dried. Accordingly, an electrode plate including the collector and a solid electrolyte layer was obtained. As the binder, a styrene-ethylene-butylene-styrene-based thermoplastic elastomer (manufactured by Asahi Kasei Corporation, Tuftec M1913, glass transition temperature: 90° C.) was used.

As the collector, two types of copper foil, that is, HA Copper Foil and HS Copper Foil (each manufactured by JX Nippon Mining & Metals Corporation, rolled copper foil, thickness: 12 μm), were used. The annealing softening curves of HA Copper Foil and HS Copper Foil are shown in FIG. 3. The annealing softening temperature of HA Copper Foil was 120° C. The annealing softening temperature of HS Copper Foil was 250° C.

After being placed on a metal-made plate heated to 130° C. and being heated to 130° C., the electrode plate thus formed was pressed at 130° C. and at a surface pressure of 460 MPa. A press temperature of 130° C. was higher than the annealing softening temperature of HA Copper Foil and was lower than the annealing softening temperature of HS Copper Foil. Since the heated metal-made plate was sufficiently thick as compared to the electrode plate, and the difference in heat capacity therebetween is sufficiently large, the temperature of the metal-made plate was regarded as the temperature of the electrode plate. In addition, the temperature of the metal-made plate was measured using a thermo couple disposed in the plate.

The electrode plate thus pressed was placed on a horizontal surface, and a height from the horizontal surface to a top portion of the electrode plate was measured as the warpage thereof. The results are shown in Table 1.

TABLE 1

| | ANNEALING SOFTENING TEMPERATURE | PRESS TEMPERATURE | WARPAGE BEFORE PRESS | WARPAGE AFTER PRESS |
| --- | --- | --- | --- | --- |
| HS COPPER FOIL | 250° C. | 130° C. | 0 mm | 6 mm |
| HA COPPER FOIL | 120° C. | 130° C. | 0 mm | 2 mm |

The warpage of the electrode plate using HS Copper Foil was 6 mm. On the other hand, the warpage of the electrode plate using HA Copper Foil was 2 mm. The results indicate that when the press step is performed at a temperature higher than the annealing softening temperature of the collector, the warpage of the pressed electrode plate can be suppressed.

The technique of the present disclosure is useful for batteries to be used in a personal digital assistant, a mobile electronic apparatus, a household electric power storage device, a motorcycle, an electric car, a hybrid electric car, and the like.

What is claimed is:

1. A battery comprising:
   a first collector;
   a first electrode layer disposed on a surface of the first collector;
   a solid electrolyte layer containing a solid electrolyte disposed over the first electrode layer; and
   a sealing layer containing a sealing material and in contact with the solid electrolyte layer,
   wherein the first collector is made of an HA copper foil.

2. The battery according to claim 1,
   wherein when a tensile strength of the first collector at 25° C. is regarded as 100%, the annealing softening temperature of the first collector is a temperature at which the tensile strength of the first collector is 90%.

3. The battery according to claim 1,
   wherein the first collector has an annealing softening curve having a flexion point.

4. The battery according to claim 1,
   wherein the first electrode layer and the solid electrolyte layer are laminated to each other, and
   the sealing layer is in contact with at least one selected from a side surface of the first electrode layer and a side surface of the solid electrolyte layer.

5. The battery according to claim 1,
   wherein the first collector has an annealing softening temperature lower than a glass transition temperature of the sealing material.

6. The battery according to claim 1,
   wherein the sealing material contains a thermoplastic resin.

7. The battery according to claim 6,
   wherein the thermoplastic resin includes a polyimide.

8. The battery according to claim 1,
   wherein the first electrode layer contains an electrode active material and a solid electrolyte.

9. A method for manufacturing a battery, the method comprising:
   heating an electric power generation element including a collector, an electrode layer, and a solid electrolyte layer to a press temperature; and
   pressing the electric power generation element at the press temperature,
   wherein the collector is made of an HA copper foil and the press temperature is higher than an annealing softening temperature of the collector.

10. The method for manufacturing a battery according to claim 9, the method further comprising:
    disposing a sealing material so as to be in contact with the electric power generation element,
    wherein when the electric power generation element is heated to the press temperature, the sealing material is heated to the press temperature, and
    when the electric power generation element is pressed, the sealing material is pressed at the press temperature.

11. The method for manufacturing a battery according to claim 10,
    wherein the sealing material has a glass transition temperature higher than the annealing softening temperature of the collector.

12. The method for manufacturing a battery according to claim 11,
    wherein the press temperature is lower than the glass transition temperature of the sealing material.

13. The battery according to claim 1,
    wherein the annealing softening temperature of the first collector is equal to or lower than 150° C.

14. The battery according to claim 1, further comprising:
    a second electrode layer disposed over the solid electrolyte layer; and
    a second collector disposed over the second electrode layer and made of a same material as the first collector,
    wherein the sealing layer is disposed between the first collector and the second collector.

15. The method for manufacturing a battery according to claim 9,
    wherein a different between the press temperature and the annealing softening temperature of the collector is more than 0° C. and equal or less than 30° C.

16. The method for manufacturing a battery according to claim 11, wherein a different between the glass transition temperature of the sealing material and the annealing softening temperature of the collector is more than 0° C. and equal or less than 30° C.

* * * * *